3,270,203
INDUSTRIAL-PROCESS-TYPE MEASUREMENTS EMPLOYING GAMMA-RAY BACKSCATTERING
Jack G. Crump, Arlington Heights, Ill., assignor to Nuclear-Chicago Corporation, Des Plaines, Ill., a corporation of Delaware
Filed Oct. 8, 1962, Ser. No. 228,985
12 Claims. (Cl. 250—83.3)

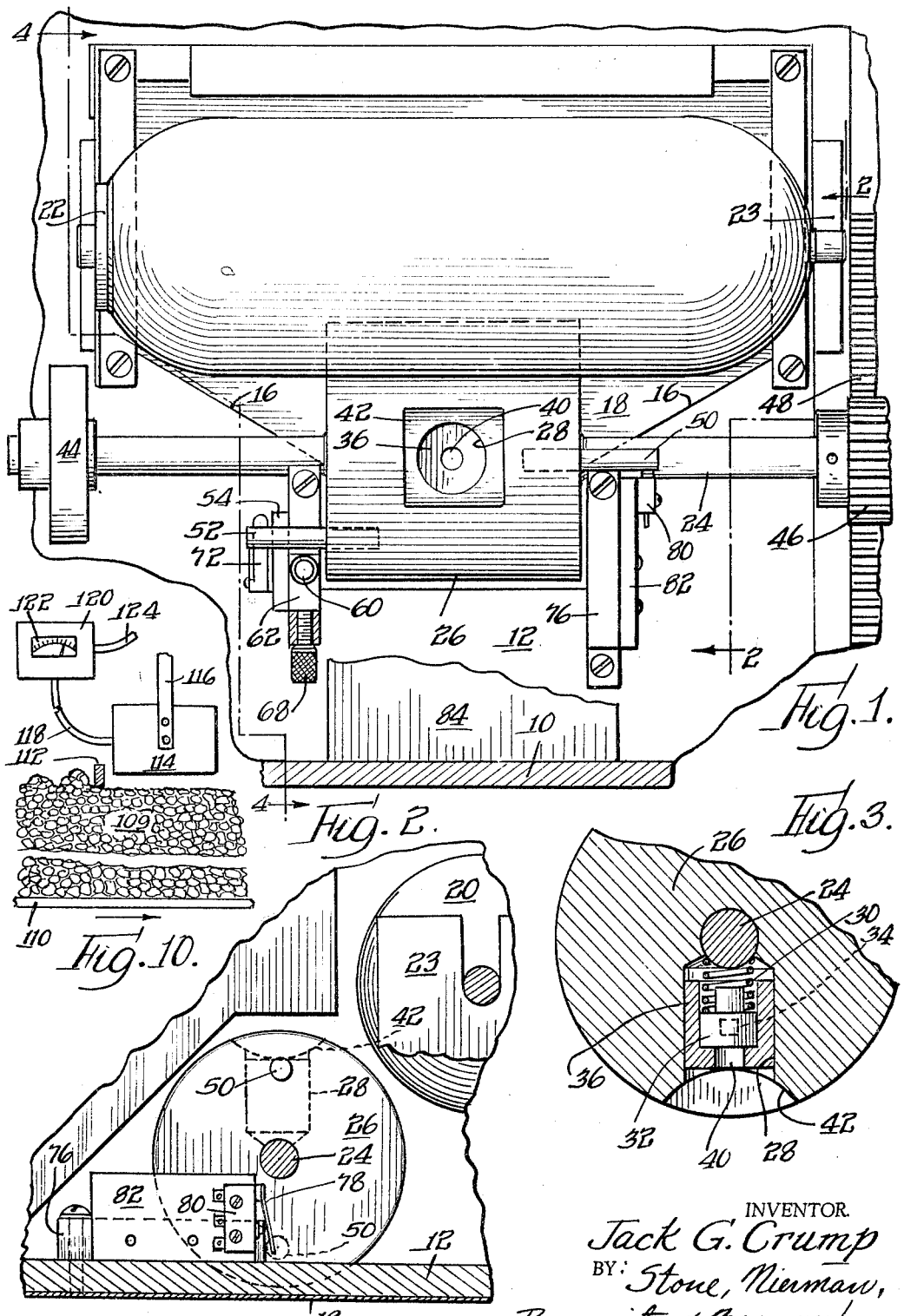

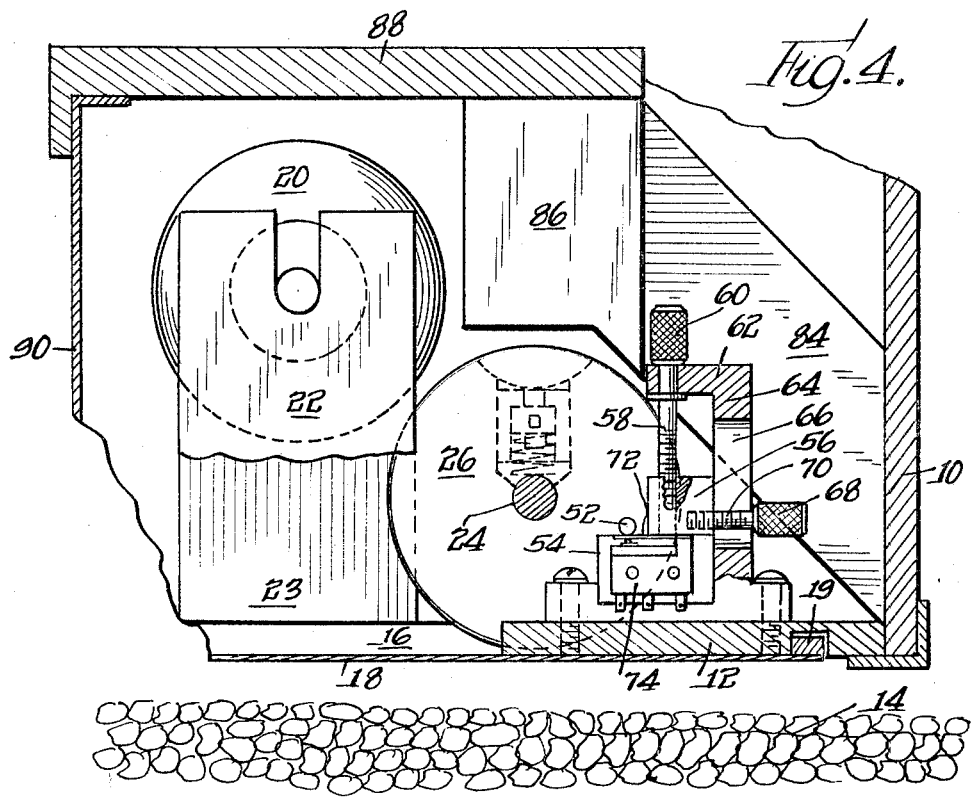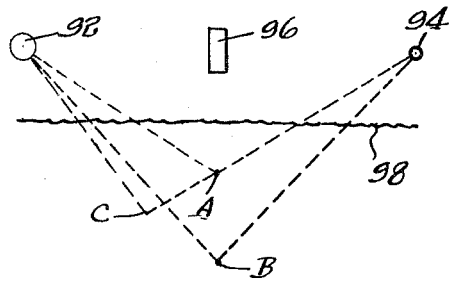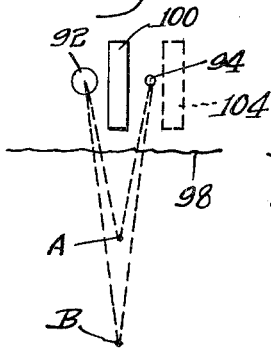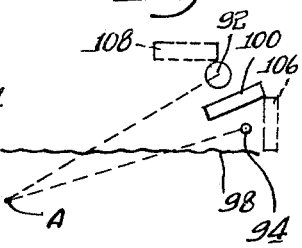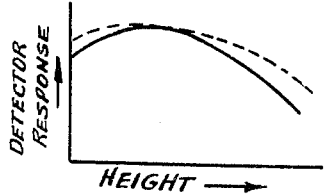
INVENTOR.
*Jack G. Crump*

This invention relates to the measurement of properties of materials by means of radioactivity, and more specifically to a method and apparatus for producing an indication of properties such as density in industrial processing of bulk materials and similar applications.

It has long been known in principle that properties of materials in the nature of density may be measured by the employment of a source of gamma rays and a detector of gamma rays, the response of the detector varying in accordance with the density of the medium. Certain applications of this general method are already fairly commonplace. For example, there exist many commercial installations of various types in which composition of liquids in pipes are monitored by transmission characteristics for gamma rays. In such applications, the source is placed on one side of a pipe and the detector on the other, the measurement constituting in essence a measurement of the difference in attenuation produced by varying densities of fluid.

In another type of utilization of this general method and type of apparatus, density of solids such as soils, rock formations, etc., are indicated by placing the source and the detector essentially in contact with the medium under measurement at spaced points, with the direct path shielded, so that the detector responds to gammas emitted by the source into the medium and scattered by the medium. In the instruments used for this general type of measurement, the general principles are similar to those used in the pipe transmission measurements, the measurement being basically a measurement of the gamma absorption, but the scattering or diffusion being relied upon for change of the direction of the radiations. This general method has found great acceptance in many fields, such as in road-building, foundation construction, and similar applications where control of density is highly important.

In principle, it would appear that either of the general methods mentioned should be readily usable in control of density of bulk materials in industrial processes, such as in the monitoring of density of materials on a conveyor belt. In practice, however, the use of such a method and apparatus has been extremely limited due to some severe practical problems which have been encountered. In the case of the transmission measurement, analogous to that performed in the measurement made on liquids in pipes, it is found that with the bulk materials used in the large-volume operations for which such indications are most badly needed from the standpoint of economics, the thicknesses of materials on the conveyor belts and similar process lines sought to be monitored are so great that the employment of methods measuring attenuation throughout the thickness, as with one of the two elements used in the measurement above the work material and the other below it, requires such a magnitude of source as to be virtually prohibitive in order to obtain adequate detector response for fully satisfactory measurement. When it is attempted to use the type of instrument used, for example, in soil surface measurements, which appear superficially similar, it is found that the dissimilarities are such as to make this method essentially useless. It is essential to this type of measurement that the device be in firm contact with the surface of the material under measurement. This condition is one which simply cannot be met in any use of an analogous type of device for industrial measurements on bulk materials, which move at high rates. Although a scraper or doctor may be employed to produce a fairly constant level surface, the rapid motion prohibits actual contact and, furthermore, even the closest of practical control over such surfaces does not permit maintaining of constancy beyond fairly sizeable fractions of an inch, and the errors produced in this type of instrument by such deviations in distance from the surface under measurement are completely excessive, in addition to the fact that the mere existence of such a spacing, even if it could be kept constant, is fairly destructive of the sensitivity of such a device. (As herein used, it will be understood that the term "senstivity" refers to the percentage change in detector response per unit change in density, the error limits imposed by this sensitivity, as used with any particular electronic system for producing an indication of the detector output, and the limitations on accuracy imposed on such a system by the statistical variation in detector response, cooperating to fix the overall "accuracy" of the indication.)

It has long been known that there exists a gamma-ray method of indication of density which differs somewhat in theory from the methods already described, and which has been frequently mentioned in the literature for purposes like those here involved, but has nevertheless, for reasons to be discussed, not found any practical use. It has long been known that the Compton scattering which is used in the second of the methods described above to avoid the necessity of any direct transmission path between source and detector in the measurement which is basically a measurement of absorption, may itself be used in principle as an indicator of density, it being well known that the flux or field of gammas backscattered from high-density materials is greater than that from low-density materials. In its grosser aspects, this phenomenon appears generally similar to that of the scattering of charged particles (betas or alphas) except for the much higher penetrative power of the gammas, so that this method of measurement appears superficially to present an easy solution to density measurement problems, both because the greater penetration permits discrimination against mere surface effects which would render a charged-particle measurement meaningless if it could be made, and further because the use of the gammas eliminates the problems of energy absorption by air, etc., which render any normal kind of charged-particle measurement nonsensical for purposes such as those presently under discussion. Accordingly, there is much in the literature of a more or less speculative nature regarding the possibility of using this phenomenon for density control of bulk materials. However, when attempts have been made to actually use such measurements for practical purposes of control of density, it has been found that the problems encountered with the methods and apparatus previously known have heretofore proved prohibitive for practical use for the small percentage changes in density which must be accurately measured to produce any really useful result in industrial control. Thus a quite recent compilation published by the United States Atomic Energy Commission entitled "Radiation Uses in Industry and Science" by Brownell, published in 1961, although showing commercial transmission or absorption-type gauges of both types mentioned above, including one for a specialized type of conveyor belt application, refers to the gamma scattering method only in connection with application of the method "experimentally" in a sorting operation involving two materials having a ratio of denesities of approximately two to one.

The object of the present invention is, accordingly, to provide a method and apparatus of the gamma-scattering type to achieve as actuality the potential of this approach to the problems of monitoring and controlling properties of bulk materials in industrial processing and similar uses, heretofore frequently recognized but never capable of useful implementation. The present invention flows from the identification of the nature of the practical problems to which satisfactory solutions have not heretofore been devised, and the nature of the interrelation between these problems, thus enabling the reaching, by proper experimentation, of simultaneous solution rendering the general method and type of apparatus suitable for practical use. The embodiment of the invention herein to be described is a commercial product representing apparatus specifically designed for practice of the method of the invention. However, as will hereinafter be seen, the basic underlying method may be employed without such special equipment design (although less advantageously of course), as by mere proper manipulation or operation of well-known equipment designed for other purposes. The more general aspects of the underlying method, and the manner in which the method may be practiced with apparatus heretofore existing for different purposes, may best be understood after the particular embodiment selected for illustration in accordance with the patent laws is described along with such theory of the operation experimentally observed as is presently known.

In the drawing:

FIGURE 1 is a plan view of a source-and-detector assembly, mounted in a suitable housing, for use in the processing of bulk materials, producing an indication of the density of a work material passing beneath the housing on a conveyor belt;

FIGURE 2 is a fragmentary sectional view taken along the offset line 2—2 of FIGURE 1 in the direction indicated by arrows, showing the source-and-detector assembly as seen from the side, with the source in the position assumed when the device is not in use, this also being the condition shown in FIGURE 1;

FIGURE 3 is a fragmentary sectional view of a shield cylinder constituting a portion of the device, but illustrated in the position assumed when the device is in use;

FIGURE 4 is a sectional view taken along the line 4—4 of FIGURE 1, showing the source-and-detector as viewed from the end opposite the view of FIGURE 2, along with a provision for adjustment of the position of the source in the calibration or storage position therein illustrated;

FIGURE 5 is a diagrammatic representation of certain phenomena occurring in the method of the invention in its broader aspects;

FIGURE 6 is a diagrammatic illustration similar to FIGURE 5, but showing a modified and improved form of the method;

FIGURE 7 is a similar representation of a further modified form of the general teachings of the invention;

FIGURE 8 is a more or less schematic graphic representation of the response characteristics obtained in varying the distance of embodiments of source-and-detector assemblies from certain types of materials under measurement, illustrating the manner of assessment of relative merit;

FIGURE 9 is similar to FIGURE 8, but illustrates the general characteristics obtained when the same embodiments are applied to the indication of density of relatively light materials as compared to the heavier materials to which the graphic curves of FIGURE 8 are applicable; and FIGURE 10 is a schematic representation of the device illustrated in FIGURES 1 through 4 as connected to a suitable indicating meter and mounted over a conveyor belt bearing the material under measurement.

Referring now to the embodiment of the invention shown in FIGURES 1 through 4, the assembly is mounted in a housing (only the portion containing the assembly of the invention being shown) having a front wall 10 and a bottom 12, beneath which there passes the material being monitored, illustrated at 14, coal being a suitable example upon which the illustrated device has proven to produce accurate density indications. The wall 10 and bottom 12 are of suitably strong material such as thick aluminum, but the portion of the bottom 12 beneath the source-and-detector assembly to be described, designated by the numeral 16, is completely cut out from the thick bottom and covered with a thin sheet 18 of aluminum or similar material essentially entirely transparent to gamma-rays, this sheet 18 being mounted by means of a frame 19 inset into suitable grooves in the outer surface of the bottom 12 and suitably fastened in place. The source-and-detector assembly now to be described is mounted on the thick or strong portion of the housing bottom 12, but is in essence separated from the material under measurement only by the negligible bottom sheet 18.

The detector 20 is a high-pressure high-efficiency ionization chamber of, for example, three-inch diameter and approximately a foot length. It is supported by support brackets 22 and 23 at the respective ends and substantially spaced from the bottom sheet or "window" 18, a spacing of two inches being suitable.

A shaft 24 is mounted for rotation on an axis forward of, and below, the axis of the cylindrical ionization chamber detector 20 and a shield cylinder 26 is affixed to this shaft for rotation. The shield cylinder 26, which may be, for example, of three-inch diameter and is preferably of extremely heavy material such as a tungsten alloy of the type sold under the trade name of "Hevimet," has a radial bore 28 in the bottom of which is a helical spring 30 against the outer end of which is seated a source capsule 32 containing a gamma-ray source 34 in its central portion. The source 34 is an emitter of gammas of suitable energy, such as cesium-137. The outer end of the capsule 32 is seated in the bottom of an inverted cup-shaped collimator retainer 36, having a central bore 40; the cup 36 is formed of the type of alloy previously mentioned, and the bore 40 serves to produce a beam of radiation of the order of thirty-five degrees in total width. A recess 42 of cylindrical concavity at the outer end of the bore 28 in the cylinder 26 forms a flare at the outer end of the source receptacle bore permitting the substitution of source assemblies of wider angle of distribution for gross types of measurement wherein the advantages of the present invention as regards precision of measurement are not required.

The shaft 24 is supported at one end in a bearing support 44 and is similarly supported at the other end (not shown), adjacent to which it bears a pinion 46 meshing with a slideable rack 48. The latter is driven by a suitable mechanism (not illustrated because of irrelevance to the present invention) at the rear of the housing for rotation of the shield cylinder 26 between a measuring position at one extreme of the angular rotation and a storage and calibration position at the other extreme.

The device is shown in FIGURES 1, 2 and 4 in the calibration or storage condition, the bore in the cylinder bearing the source facing upward away from the normal location of material to be measured. The device is shown in the opposite position, i.e., in the operating position, in FIGURE 3, and in the dotted alternate position of FIGURE 2. These extreme positions or limits of rotation are fixed by the provision of stop pins extending from the shield cylinder 26 parallel with the shaft, a pin 50 extending from the right side in the view of FIGURE 1, and being accordingly seen in FIGURE 2, and a pin 52 extending from the left side and being seen in FIGURE 4. The two pins 50 and 52 are located at suitable rotational angles of the cylinder with respect to each other and with respect to the source to produce, in cooperation with the respective stop structures on the housing to be described, the substantial half-turn rotational freedom mentioned above.

At the left side of the cylinder (shown in FIGURE 4), a stop block 54 in the rotational path of the pin 52 is mounted on a vertically moveable slide block 56, through which is threaded an adjusting screw 58 with a suitable manual adjustment head or knob 60. The upper end of the screw 58 is fixedly journalled for rotation in a fixed arm 62 extending inward from a vertical guide 64, so that the vertical position of the slide block 56 is adjustable by the screw 58. A slot 66 in the vertical guide 64 permits such adjustment upon loosening of the locking head 68 of a screw 70 which extends through the slot and is threaded into the slide block 56; re-tightening of the head 68 after such an adjustment locks the block 56 in the selected vertical position, thus permitting adjustment over some range of the exact position of the source with respect to the exact upright position shown, when the pin 52 is against the block 54. At the same time, the pin 52 is in engagement with the actuating leaf 72 of a microswitch 74, secured to the vertically moveably assembly just described. The switch 74 may, if desired, be used in the circuit of the drive mechanism for the rack 48 to actuate a locking brake or similar device while withdrawing power from the drive, but preferably, for purposes of safety in the event of power failure, the device is biased to this position by a suitable spring, so that the source is placed in the storage position in the event of power failure; in this preferred mode of operation, the switch 74 merely serves to activate a panel light or similar indicator showing the stored condition of the source. The purpose of the adjustment mechanism for fixing this limit of motion of the source will be described subsequently.

At the opposite side or end of the cylinder 26, a fixed stop block 76 mounted on the bottom 12 engages the pin 50 to limit the rotation to the position shown in FIGURE 3, wherein the collimated beam from the source faces directly downwardly into the material under measurement. Again, the pin 50 engages the leaf actuator 78 of a microswitch 80 on a mounting plate 82 attached to the stop block 76, this switch also being usable, if desired, in the circuit of the drive or a brake, but preferably being used for mere remote indication or warning that the source is in the operating position, with the mechanism held in the operating position by a power-reliant device such as a bleeding pneumatic cylinder or similar drive, permitting a spring such as that previously mentioned to return the source to the storage position in the event of power failure.

A diagonal shield block, for example of lead, has its lower end formed to fit the front internal corner of the housing and extends upwardly and inwardly, this portion of the shield, indicated at 84, terminating at its upper end in a horizontal thick tongue portion or shield block 86, the latter being disposed in the path of the beam from the source in the storage position and thus fully shielding the source. The unitary lead structure forming the portions 84 and 86 is supported by suitable supports extending from opposite sides of the housing (not shown, being conventional in construction). A top shield 88, having its rearward portion resting on a support 90 extending from the bottom 12 up beyond the top of the detector 20, is horizontally disposed with its front end resting on the top of the shield block 86.

It will be observed that the disposition of the collimated source shown in FIGURE 4 in the storage position with relation to the detector 20 and the shield block 86, although preventing direct irradiation of the detector 20 by the source, nevertheless produces substantial irradiation of the detector 20 by gammas scattered from the lead shield 86. The amount of this irradiation or exposure of the detector 20 may be varied by variation of the orientation of the source in either direction from the exact upright position illustrated. This scattered radiation is employed for the occasional calibration or standardization which is normally required in any radioactivity source-and-detector device to produce compensation for slow drifts in associated electronic equipment, power-line variations, and similar occasional "tune-up" or calibration standardization. The adjustment of the end-stop engagement previously described permits the establishment of any particular desired output from the detector as a calibration signal for the electronic equipment used for indication of the density under measurement (either for visual inspection or in the form of an electrical control signal), such adjustment being desirable both as a final assembly or installation operation of new equipment, to compensate for minor variations in source strength or detector characteristics, and to permit adjustment of this "standard irradiation" at suitably long intervals to compensate for any source decay, detector aging, or similar causes of long-term drift or changes caused by replacement, or requirement of a different calibration signal for some reason such as adaptation of the calibration of the device to a different density range, etc.

Coming now to the more basic features of "geometry" of the actual measurement, and the manner in which they solve problems heretofore devoid of satisfactory solution, it will be seen that the source-and-detector geometry shown in FIGURE 4 (with the alteration that the source points downward as in FIGURE 3) is substantially different from those in common use for other purposes. The structure has in common with other geometries heretofore known involving gamma scattering the obviously necessary presence of shielding between the source and the detector to block direct passage of radiations. Beyond this, however, there is substantial departure from normally employed geometries. The detector size and other important characteristics of the geometry which have been found to produce exteremely stable and reliable results in measuring density have been in general given above and may be easily reproduced with the above information, supplemented, if necessary, by dimensional details which may be readily reached with a minimum of experimentation for any given material under measurement if exact and completely optimum performance must be obtained, or may be taken directly from the drawing, in which the vital (but not highly critical except for extreme optimization) dimensions are to scale. The only substantial variable involved is the intensity of the source. This, as is well known, depends upon the necessary speed of the measurement, and is accordingly variable in its requirements depending upon the speed of the conveyor belt or other means for producing relative motion between the measuring device and the process material, and also on the abruptness or slowness with which density changes which are being monitored are known to occur in the given process in which the device is used. Likewise, the electronic equipment to which the output signal of the detector is fed will at least in part be determined by this same source size variable. Obviously, the design of the source capsule itself has some effect on the required source size, the shape of the actual source, which of course should be exactly centered within the capsule, desirably being selected so that the minimum of the source radiation is obsorbed in producing the collimated beam. An excellent combination, suitable for the measurement of density of the large bulk of all materials commonly encountered in industrial processes, from light materials such as coal to heavy materials such as raw ores, uses a cesium-137 source of approximately one-half curie with the output of the detector connected to a vibrating condenser type of electrometer circuit. Highly sensitive density measurements can be made with this combination, with the surface of the material under measurement at about a quarter-of-an-inch below the window (with reasonable variations of this level producing negligible effects) with sufficiently fast response time to cover the vast majority of all industrial applications of such a device.

The basic underlying operational features of the commercial construction just described will best be understood from description of the shortcomings of previously known source-and-detector geometries which have been found for the industrial bulk materials use, and the manner in which the present invention has solved the problems therewith encountered to make the employment of scattered radiation a practicality for measurements on industrial bulk materials.

It is found to be prohibitive to attempt to make density measurements on fast-moving conveyor-belt bulk materials by methods involving actual contact between some portions of the measuring instrument and the material under measurement; such contact is used to standardize the relative locations of the source, the detector and the measured substances in static-type measurements made on soils and similar materials. In the present use of radioactivity, the measuring instrument must be spaced from the conveyor-belt material by an amount sufficient to insure that normal variations in location of the material surface (normally height of the bulk material on the conveyor belt) will not cause actual contact between the instrument and the material. It is readily practical, by known scraper and doctor blade techniques, to maintain a sufficiently narrow range of such variation to permit location of the measuring instrument as little as about a quarter-inch from the normal or nominal surface location of a conveyed material like fine coal, the normal variations of height being about the same magnitude. However, when trial is made of a source-and-detector geometry of the type commonly used where contact is permitted, it is found that the detector response variation due to this range of height or distance variation is prohibitively great.

As such an instrument or "probe" is raised over a range of a half-inch or so, the response of the detector is found to rise rapidly, the amount of the rise being a substantial multiple of the rise which could be expected to occur as a result of an extremely great decrease in density. Upon analysis of the reason for this rise, it is seen that the rise must occur because the lifting from the surface permits the detector to respond to a large component immediately created of scattered radiation subjected to vary little absorption path in the material, being emitted at small angles from the horizontal and singly or doubly scattered to the detector without ever being subjected to the multiple collisions upon which the entire absorption measurement is based. As is well known, this type of instrument, to the extent that it meets the problems of accuracy and source size limitation mentioned above, does so by using essentially 180 degrees emission and acceptance angles at the source and the detector (or slightly less to eliminate the effects of minor surface irregularities), and it is observed that the rapid rise with small distances stems from this source. Accordingly, the type of instrument used for surface measurements may be altered by the insertion of shielding of the source and the detector in the direction making small angles with the surface of the material to prevent this "spurious" addition to the counting rate (hereinafter referred, for reasons which will later become apparent, as "large-included-angle scattering," by reference to the included angle between the path of a gamma as it leaves the source and the path as it strikes the detector, rather than calling this "small-angle scattering," by reference to the angle made with the surface, or the angle of deflection from a straight path, as is sometimes conventional). As successively more shielding is done in these directions (i.e., as the most direct source emission and detector reception angles are brought further from the horizontal toward the vertical, in attempting to eliminate the large-included-angle scattering component producing the spurious signal changes) the counting rates become reduced to the point of complete unacceptability long before reaching any point where the sensitivity to height change becomes small compared to the sensitivity to density change.

The observations thus far described provide the starting point for the solution to the problem, both as embodied in specific construction previously described, and as regards the more general principles. In the device of the present invention, the increase of scattering response with density is used as the measurement indicator, and special features of the invention produce complete satisfaction of all requirements.

It is found that if the withdrawal of the original unmodified form of the surface instrument from the surface is far beyond the distance required for spacing from a moving work material, the counting rate continues to rise, but at a gradually diminishing rate of increase until there is reached a maximum detector response, at a point beyond which further withdrawal is accompanied by drop, rather than rise, of the detector output. As is well known from elementary meathematical principles, or readily observable from visual inspection of a plot of data so taken, the region of this maximum necessarily demonstrates over some more or less substantial range of distances relative insensitivity of detector response to distance from the surface (hereinafter called "height"). This finding represents the first step or key to the solution to the problem of bulk density measurements, and it is the disposing of the source-and-detector at a height or distance such that the detector response as a function of height or distance is substantially at a maximum point that is the most basic or underlying change or alteration which characterizes or distinguishes the present method from any heretofore known for the same or analogous purposes.

But it is found that the solution of the height problem is not, without further alterations, the complete answer to the problem of practical utilization of gamma radiation in process monitoring of bulk materials. When the structure just described (essentially a contact-type absorption measurement geometry spaced from the surface under measurement by an amount giving maximum detector response) is made the subject of experiment as regards sensitivity (percentage change of output) to density, this practical requirement is found to be no longer met. Although sufficiently high counting rates with sources of reasonable size are readily obtained (higher, as above indicated, than in the surface-contact type of measurement), the change in detector response with even fairly large density changes is found to be far too small for the achievement of fully practical error limits required in industrial processes. The second major feature of the method and apparatus of the present invention, i.e., the second feature of the basic measuring "geometry," is the alteration in structure required to restore to the measurement using the height-independence aspect of the invention the sensitivity which characterizes the instruments employing gamma activity for measurement of density in other types of industrial processes. The manner in which this is achieved has been experimentally determined in reaching the structure of the most practical and optimum forms of the invention. It is found that the solution to the problem of providing the desired combination of sensitivity and height-independence is achieved by using geometries in which the source and the detector are relatively closely spaced as compared with the much larger spacing used in the surface-contact type of device, and further that either the spacing of the source and detector, respectively, from the surface of the material or the suitable location of shielding and reflecting members of heavy material, or both, must be so selected that the most direct single-scattering or single collision paths between the source and the detector have a relatively small included angle. To achieve reasonable practicality, the overall features of construction which constitute the geometry must be such that the detector cannot respond to direct radiations from the source singly reflected or scattered from the material under measurement with an included angle of greater than 45 degrees, and the limitation of this angle to much smaller values produces optimum results, a maximum single-scatter angle of 20 degrees or less producing substantially the same type of sensitivity to density as is obtained in the surface-contact method, while at the same time not only permitting operation away from the surface but permitting substantial variations of this spacing without sufficiently large effects on response to make such variations simulate sufficiently large variations in density to produce degrees of error which are not generally acceptable. The exact theory by which these experimental findings are fully explained is not presently known. The processes of absorption and scattering of gamma rays in materials are so complex that the making of quantitative analyses for exact prediction of results to be obtained in any particular set-up or geometry, or even of exact explanation of experimental results on the basis of theory, are virtually impossible. Although there have been, over many years, various types of theoretical analyses of gamma-ray scattering and absorption, the variation of cross-section with energy of the gamma and the loss of energy which occurs in each scattering collision, make prohibitive any carrying of fully quantitative treatment to practical situations such as that of the present type.

The discussion which follows of the highly schematic representations of FIGURES 5 through 9 accordingly will be understood to be merely the best known theory to the applicant to explain the superiority of the geometries found to be suitable for the purpose, and at the same time to permit extrapolation to other geometrices which, although far different in appearance, are nevertheless found to contain the same basic features and accordingly to produce the same basic results. It will be observed, of course, that the explanations herein given or propounded should not be considered as vital to the patent protection to be afforded the invention, since the exact theory of operation, whether hereafter verified by experiment or hereafter negated by experiment, is not necessary for the use of the structures or method which have been found experimentally to possess the advantages discussed, irrespective of the exactness, or even complete incorrectness, of the theory as presently known.

FIGURE 5 shows in highly schematic form a geometry which for present purposes can be considered as equivalent to that used in instruments for contact measurments on surfaces such as those of soils, as previously described. There are here shown a detector 92 and a source 94, widely spaced, with an intermediate shield 96 blocking direct radiations. As will be observed by persons skilled in the art, this schematic indication as so far described approximates the geometry or construction used in the surface-contact instruments for soil measurement.

This assembly, when spaced from the material under measurement, is found to demonstrate extremely poor sensitivity, as previously indicated. The reasons for this poor sensitivity are not readily obvious, but by making certain simplifying assumptions concerning the scattering phenomena a rough theory may be constructed to explain the experimental results. Details of the assumptions involved, and the grounds of their being believed reasonable, are not here required. For present purposes it is merely necessary to state that the single-scattered gammas are considered as being affected by density charges in a direction or sense representative of the overall or total detection, and, further, all gammas are considered as being scattered after a single length of passage through the measured material, constituting a "mean" path for each density; further, the theory is based on the rough approximation (which may likewise be shown to be reasonable) that the primary effect of density change on detector response to single scattered radiation is caused by change of the distance of the detector from the scattering point.

With these assumptions, and by making certain other approximations, it may be shown that if the mean distance traveled in the material by gammas emitted from the source 94 ends at point A in FIGURE 5 at one density value, a decrease of density producing a lengthening of the mean distance to point C where it will produce an increase of detection of slightly scattered gammas emitted along this line by the source. (The illustrated lengthening represents a gross exaggeration of the ranges of density actually encountered in industrial process control, such exaggeration being convenient for understanding.) The same decrease of density, however, produces a decrease of detection of the gammas emitted along another line, such as that from the source to B, the point of scattering where the overall path is symmetrical with respect to the source and detector. When such results are considered over all paths in the radiation pattern from the source, it is seen that the effects of density on the detector response are largely self-cancelling. The effect of density upon the response of the detector to radiations emitted by the source along any given line varies with the included angle at the point of scattering, i.e., the angle included between the lines connecting that point with the source and with the detector. Where this angle is greater than 90 degrees, a decrease in density produces an increase in response, and where it is less than 90 degrees, a decrease in density produces a decrease in response.

It follows from this that the provision of confining the maximum included angle made by a line of emission from the source and a line of reception by the detector to less than 90 degrees eliminates the cancelling component, and thus increases the sensitivity.

Coming now to FIGURE 6, it will be seen that here the overall device is somewhat similar to that of FIGURE 5 but with two important exceptions. First of all, the source has been moved much closer to the detector. Since it is the radiation perpendicular to the surface which is most dense, a much higher proportion of the emissions from the source are now effective in single-scattering than previously. Additionally, the shield block, now designated as 100, is lengthened downwardly to reduce the maximum direct scattering angle to well below 90 degrees. It will be seen that the maximum angle in this geometry, as in FIGURE 5, is obtained right at the top surface, midway between the source and detector, i.e., the symmetrical angle determines the maximum. The elimination of the single scattering at angles of more than 90 degrees completely eliminates the counter-effects previously discussed in connection with the geometry of FIGURE 5 as regards moving the first scattering point along any path from the source closer, rather than further from the detector, in response to a decrease in density. Additionally, this reduction of the maximum scattering angle now produces a ratio of distances of the reflection or scattering points A and B from the detector which is much higher than it previously was. The bringing together of the source and detector also aids greatly in reducing the counter-effects produced in the previous case, upon density reduction, by reduction of the distance traveled by (for example) multiply scattered radiation emitted directly downwardly and detected directly upwardly. An additional benefit obtained is the fact that with any fixed density, the point at which height-independence is achieved is much closer to the surface than in the case of the wide spacing of FIGURE 5. This advantage, fairly closely related to others in basic theory, produces much more uniformity of direction of entry of the gammas effective in the measurement into the material, thus again adding to the sensitivity by reduction of the various counter-effects. If desired, an additional shield may be added at 104 on the opposite side of the source 94 from the detector, serving to scatter gammas emitted in this direction back into the effective zone of the measurement, while at the same time eliminating the counter-effects on the principal sensitivity direction which may be produced by the extraneous radiation thus blocked off.

In FIGURE 7 is shown a further modification which will be found in general principle to closely resemble in many respects the embodiment of the commercial device previously described. Here the device of FIGURE 6 is essentially rotated sideways, thus obtaining the benefits of bringing the source closer to the surface. It will be observed that this basic element is present in FIGURE 4, although with somewhat lesser degree of tilt, the device of FIGURE 4 also using a collimated beam, for closer confinement of the direct or single scattering path to a very narrow angle. In the device of FIGURE 7, there are also shown in dotted form a reflector block 108 and a supplementary reflector block 106 used to increase the utilization and directivity characteristics. The block 106 corresponds roughly in function to that of block 104 of FIGURE 6, previously described, and has no exact counterpart in the commercial embodiment, its necessity being eliminated by the collimator, while the block 108 of FIGURE 7 finds its counterpart in the shield block 88 of the embodiment previously fully described.

It will be readily obvious that a large variety of specific designs within the general teachings can be formulated. In FIGURES 8 and 9 are illustrated, more or less schematically, the height independence characteristics of devices or geometries of various types within the general type of the present invention when applied to different materials. Although the optimum design varies somewhat with exact material under measurement, the general characteristics of devices made in accordance with the invention, or the method of the invention, as regards height variation are shown in FIGURE 8, typifying optimum and slightly less optimum types of curves which are obtained with heavy materials, while FIGURE 9 shows the same type of representation characteristic of lighter materials, which in general, of course, do not have a substantial rise at the commencement of taking them out of contact with the work, but are nevertheless operated at substantially the maximum point, which in this case, of course, means as close as permissible to the work surface.

In FIGURE 10 is shown in highly schematic form the manner in which the industrial processing device of commercial construction previously described is mounted and used. As there shown, the work load or process material 108 is carried on a conveyor belt 110 (provided with the short-interval rollers and similar supports conventionally used at points where maintenance of exact level is required, and accordingly omitted from the illustration). There is provided (shown, of course, in highly schematic form) a scraper or doctor 112 smoothing and levelling the upper surface of the work material 109 adjacent to the forward end of the housing 114, which is suitably suspended by supports schematically illustrated at 116, the output of the detector being connected by a cable 118 to the electronic equipment 120 producing indications of the density both in visual form, by means of a read-out meter 122 (of either the needle type illustrated or of the digital-reading type) and also in the form of an electrical signal in an output cable 124 which may be employed in the actuation of either relay-type or proportional-type controls restoring the desired condition of the property of the process material being controlled, basic measurement being of density but this being employed in many uses, as is well known in connection with other gamma ray measurements, for control of composition variation actually producing a density variation which is of itself not the factor of direct interest in the process.

As has been previously pointed out, the method and apparatus of the invention originated with the seeking of a suitable bulk density measurement for industrial processing which would have performance characteristics comparable to those of the contact-type devices used in soil measurements and similar applications, for which they have been found fully satisfactory. However, it will be obvious, now that the teachings of the invention have been provided, that they are very likely to find use for other purposes than their original one, in some cases for other types of measurements for which there previously existed no suitable device, and in some cases for improvement of existing devices heretofore thought satisfactory. As an example of the latter, the ability of the method and apparatus of the invention to produce the highly satisfactory measurements at a reasonable spacing from the work, and the substantial independence of the measurement accuracy from reasonable variations in this spacing, may well be employed in improvement of soil measurement devices. One limitation on devices known for this purpose prior to the present invention was the restriction to a static relation between the instrument and the soil under measurement. With the present invention, there is permitted the mounting of the soil density device on wheels or rollers for the making of suitable continuous measurements while the device is moved over the surface under measurement, either manually by an operator observing the meter or other indicating device for the observation of discontinuities or small areas of material outside the allowable tolerances which cannot be found with the point-by-point measurements to which this type of device has previously been limited, or mounted for self-propulsion at a slow rate, with a suitable recording meter coupled to the drive to produce plots of density as a function of exact location. The provision of a device of the latter type, made possible for the first time by the present invention, may well enable the performance of research on roads, particularly on the conditions existing before the appeareace of visible defects due to types of use and weather, for which purposes no previously existing instrument was sufficiently practical to undertake the periodic measurements required.

In utilization of the invention to maximum advantage, there are certain additional details of design which may advantageously be noted in guiding the experimentation resuired for adopting the invention to any particular purpose. It will be observed that one of the assumptions made in the analysis preserved the mean free path of the radiation after first scattering as being equal to that which existed upon emission from the source. The inaccuracy of this assumption was previously stated. The primary effect of this error is to alter the diagrammatical showings of the sketches in that the actual angle of reflection of the singly scattered radiation (still assuming the fixed, rather than statistically distributed, "mean free path" which in itself produces no qualitative error) at which the maximum occurs is displaced from the completely symmetrical position illustrated in FIGURES 5 and 6. This maximum angle actually is achieved at the symmetrical point with a tilt such as shown (in exaggerated form) in FIGURE 7, and such a tilt is accordingly found helpful for sensitivity (and will be found to exist in the commercial embodiment). The optimum angle of tilt, however, may be found only by experiment with any particular material under measurement, since consideration of only the single scattered radiation is in any event an oversimplification, as earlier indicated, from a completely quantitative standpoint. It will also be noted that excessively small maximum angles will require increase of distance for best operation, since if singly scattered gammas cannot possibly be detected unless they have traversed and retraverse the distance from the surface to a point so deep in the material that they will have been absorbed, much of the sensitivity is obviously lost. It might also be noted in this regard that the optimization of sensitivity is not necessarily obtained with exactly the same design as optimization of height-independence, so that exact details of use of the invention may depend on which of these factors are most important in any particular utilization. As another item, it will be seen that it is not desirable that there be any high degree of collimation of the detector if the source is collimated, since a fully collimated geometry not only produces unusable counting rates, but is incapable of achieving any reasonable degree of height independence. It will also be obvious that the discussion above assumes the medium under measurement to be essentially infinitely thick, and modification is required where thinner layers must be measured. This factor is generally negligible for heavy materials on conveyor belts, but the thickness appearing infinite is of course greater with light materials. Another item to be noted in connection with adoption to particular materials is that, as will be seen above, the lighter materials produce smaller permissible maximum angles of single scatter for any given distance from the material under measurement, and any given distance or spacing from the work material. Also, from the analysis of the operation which is set forth, it will be seen that the sensitivity to density changes (any given percentage change in density) is somewhat higher for lighter materials than for heavier materials, both because of ability to operate closer to the surface with maximum sensitivity and because of the greater change in effective thickness caused by any given percentage density change, so that the utilization of the general method, i.e., the "positive" type of scattering measurement in which detector response rises with density, proves much more sensitive than might be predictable from laboratory experiments and similar previous work with scattering on materials such as solid metals, when applied to the much less dense range of material densities (weights of from approximately 30 to 200 pounds per cubic foot) encountered in industrial processes. However, although the geometry methodology of the invention is of greatest advantage in the ordinary range of materials mentioned, the principles of the invention may be adapted to produce much more satisfactory results in application to such extremely heavy materials in industrial-type applications than can be obtained, for example, from the types of geometry used in laboratory experiments on gamma scattering.

Persons skilled in the art of radioactivity gauging for various purposes will readily recognize many other uses for the general teachings of the present invention, and will devise alterations and improvements thereon for particular purposes. Likewise, and the adaptation of the invention to uses of radioactivity measurements now completely unknown will produce forms and details of practice of the invention which appear far different from anything herein specifically disclosed, but which nevertheless will be found to constitute mere adaptation of the basic teachings of the present invention to different environments and particular requirements. Accordingly, the scope of the patent protection to be afforded the invention should be determined only in accordance with the definitions thereof contained in one or more of the appended claims.

What is claimed is:

1. In the control of industrial processing and the like, the method of producing an indication of the density of a material comprising exposing a portion of the external surface of the material to a source of gamma rays and exposing a gamma ray detector to the gamma ray emissions from another portion of tthe surface spaced from the first portion, at least one of said portions being of substantial area, the source and the detector being shielded from each other in a manner forming a maximum included angle of single scattered gammas to which the detector is exposed of substantially less than 90 degrees, and said angle being formed at a depth within the material sufficiently close to the surface to produce substantial response of the detector to the singly scattered gammas, and producing an indication of substantially the total response of the detector to gamma rays of all energies while spacing the source and detector from the surface by a distance producing a maximum of such response as a function of the spacing thereof from the surface to render the indication relatively independent of variations in said distance.

2. The method of claim 1 wherein the material is a bulk material of a density of less than 200 pounds per cubic foot.

3. In the control of industrial processing and the like, the method of producing an indication of the density of a material comprising exposing a portion of the external surface of the material to a source of gamma rays and exposing a gamma ray detector to the gamma ray emissions in a region adjacent to another portion of the surface, while shielding the source and the detector from each other and spacing them from the surface by an amount producing substantially maximum response of the detector as a function of their spacing from the surface, the portion of the surface which is exposed to the source and the portion to whose emissions the detector is exposed being mutually spaced to block the detection of gammas singly scattered at the surface, the maximum included angle of singly scattered gammas to which the detector is exposed being substantially less than 90 degrees, and the spacing of the source from the detector being smaller than the distance of either to the apex of said maximum included angle.

4. In the control of industrial processing and the like, the method of producing an indication of the density of a material comprising exposing a portion of the external surface of the material to a source of gamma rays and exposing a gamma ray detector to the gamma ray emissions in a region adjacent to another portion of the surface spaced from the first portion while shielding the source and the detector from each other and spacing them from the surface by an amount producing substantially maximum response of the detector as a function of their spacing from the surface to render the response relatively independent of small changes in said spacing.

5. In the control of industrial processing and the like, the method of producing an indication of the density or similar property of a material comprising exposing a portion of the external surface of the material to a source of gamma rays and exposing a gamma ray detector to the gamma ray emissions in a region adjacent to another portion of the surface spaced from the first portion the source and the detector being shielded from each other and spaced from each other by an amount producing an increase of detector response with an increase of density, and both being spaced from the surface of the material by an amount producing substantially a maximum response of the detector as a function of their spacing from the surface, and producing an indication of substantially the entire detector response.

6. The method of claim 5 wherein the material is of a density less than 200 pounds per cubic foot.

7. The method of claim 5 wherein the paths between the source and the detector for gamma rays striking the detector after a single scattering reaction in the material have an included angle of less than 90 degrees.

8. The method of claim 7 wherein said angle is less than 45 degrees.

9. The method of claim 7 wherein the distance of the detector from the material is greater than the distance of the source from the material.

10. In the control of industrial processing and the like, the method of producing an indication of the density of a material comprising exposing a portion of the exterior of the material to a source of gamma rays, detecting only gamma rays emitted from a substantial area of the exterior of the material other than said exposed portion, and producing a substantially energy-independent indication of all gamma rays detected, the largest angle formed in said material by any path of gamma rays into said portion and any path of returned and detected gamma rays from said area being substantially smaller than 90 degrees, while spacing the exterior of the material from the source and the region of detection by an amount substantially maximizing the detection as a function of said spacing to minimize the effects of small changes in such spacing.

11. In the control of industrial processing and the like, the method of producing an indication of the density of a material comprising exposing a portion of the exterior of the material to a source of gamma rays, detecting only gamma rays emitted from a substantial area of the exterior of the material other than said exposed portion, and producing a substantially energy-independent indication of gamma rays detected, the largest angle formed in said material by any path of gamma rays into said portion and any path of gamma rays from said area being substantially smaller than 45 degrees, while spacing the exterior of the material from the source and the region of detection by an amount substantially maximizing the detection as a function of said spacing to minimize the effects of small changes in such spacing.

12. The method of claim 11 wherein the source and the detector are spaced from the exterior of the material by amounts producing substantially maximum detector response with variations in positioning of said exterior of the material.

References Cited by the Examiner
UNITED STATES PATENTS

| | | | |
|---|---|---|---|
| 2,304,910 | 12/1942 | Hare | 250—43.5 |
| 2,675,482 | 4/1954 | Brunton | 250—83.3 |
| 2,737,186 | 3/1956 | Malins | 250—83.3 |
| 2,934,652 | 4/1960 | Caldwell | 250—83.6 |
| 2,972,682 | 2/1961 | McKay | 250—83.6 |
| 2,997,586 | 8/1961 | Scherbatskoy | 250—83.3 |
| 3,001,073 | 9/1961 | Alexander | 250—83.3 |
| 3,110,807 | 11/1963 | Wilson | 250—83.6 |

RALPH G. NILSON, *Primary Examiner.*
JAMES W. LAWRENCE, *Examiner.*